Patented Mar. 1, 1927.

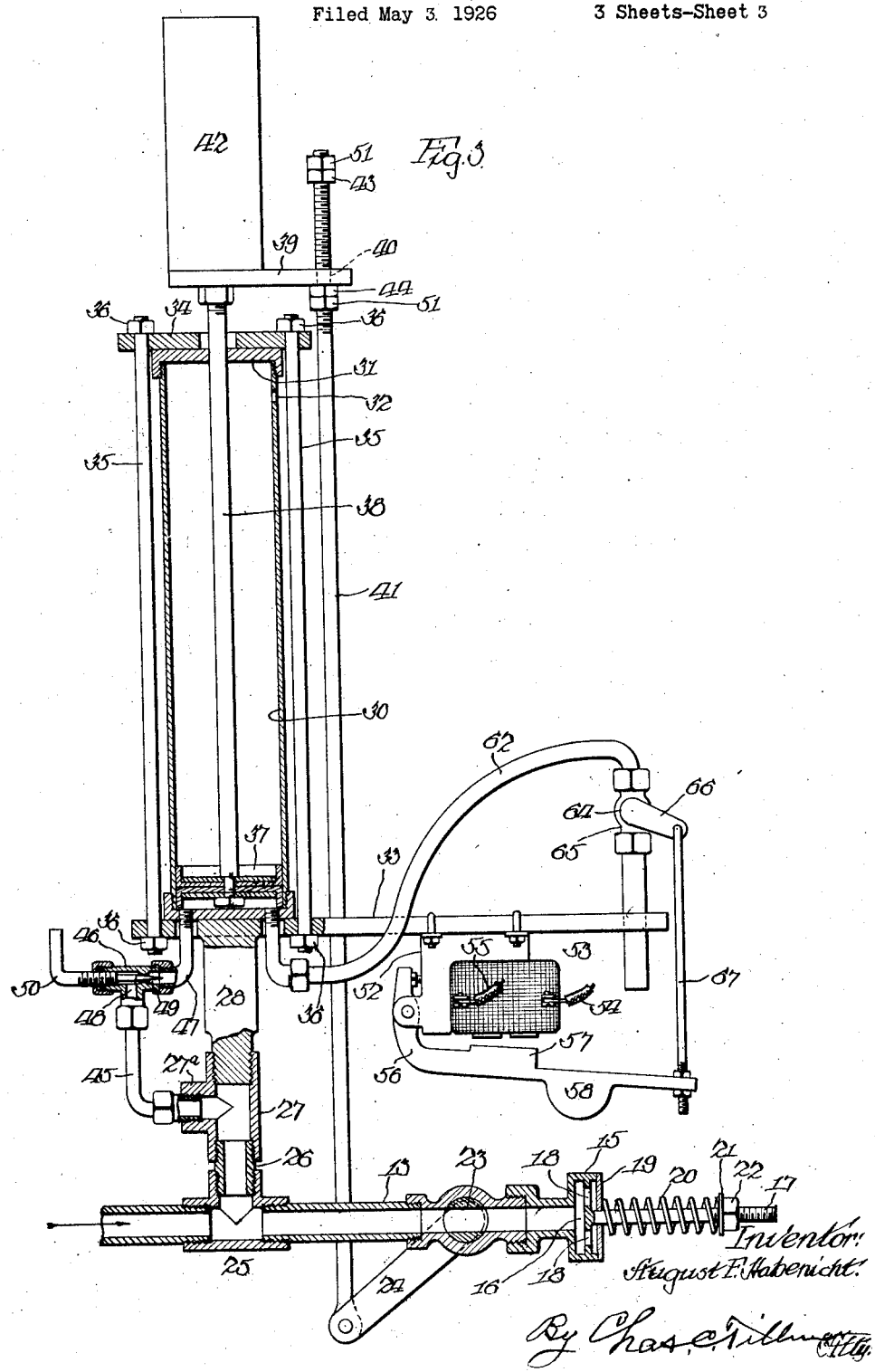

1,619,469

UNITED STATES PATENT OFFICE.

AUGUST F. HABENICHT, OF TINLEY PARK, ILLINOIS.

AUTOMATIC RELIEF VALVE.

Application filed May 3, 1926. Serial No. 106,239.

This invention relates to improvements in relief valves for pressure systems generally, but more particularly to compressed-air systems employed for pumping water, and while I have shown it in the drawings associated with a compressed air tank, a supply pipe therefor, a compressor and a motor or drive for said compressor, and will hereinafter so explain the invention, yet, I wish it to be distinctly understood that the invention is not limited in its application or use thereto, but may be employed wherever it may be found feasible or applicable, without a departure from the spirit of the invention.

The principal object of the invention is, to provide means whereby the full speed and capacity of the compressor may be obtained, in the operation of compressing fluid or liquid, without the liability of burning out the motor or driver therefor, as frequently occurs in the structures heretofore and now in general use.

Another object of the invention is, the provision of means for accomplishing the above named, as well as, other results, which shall be simple and inexpensive in construction, automatic in operation, strong, durable and highly efficient, with its parts so made and arranged, that, the quantity of fluid forced through the different parts of the device can be regulated manually, to such a degree as to afford the desired speed or capacity of the compressor, without deleteriously affecting the motor or driver therefor.

Still another object is, to furnish means for simultaneously closing the exhaust of the cylinder, when the motor and compressor are started, and to automatically close the passage to the bleed of the device, directly after the compressor has reached its maximum speed.

Various other objects of the invention will be disclosed in the following explanation and description, which will be more readily understood when read in conjunction with the accompanying drawings, which serve to illustrate an embodiment of which the invention is susceptible, it being understood that modifications and changes may be resorted to without a departure from the spirit of the invention, so long as they fall within the scope of the appended claims forming a part hereof.

In the drawings:—

Fig. 3, is a similar view of like parts as in Fig. 2, but showing a modification in the construction of the apparatus.

Like numerals of reference refer to corresponding parts throughout the different views of the drawings.

Figure 1:
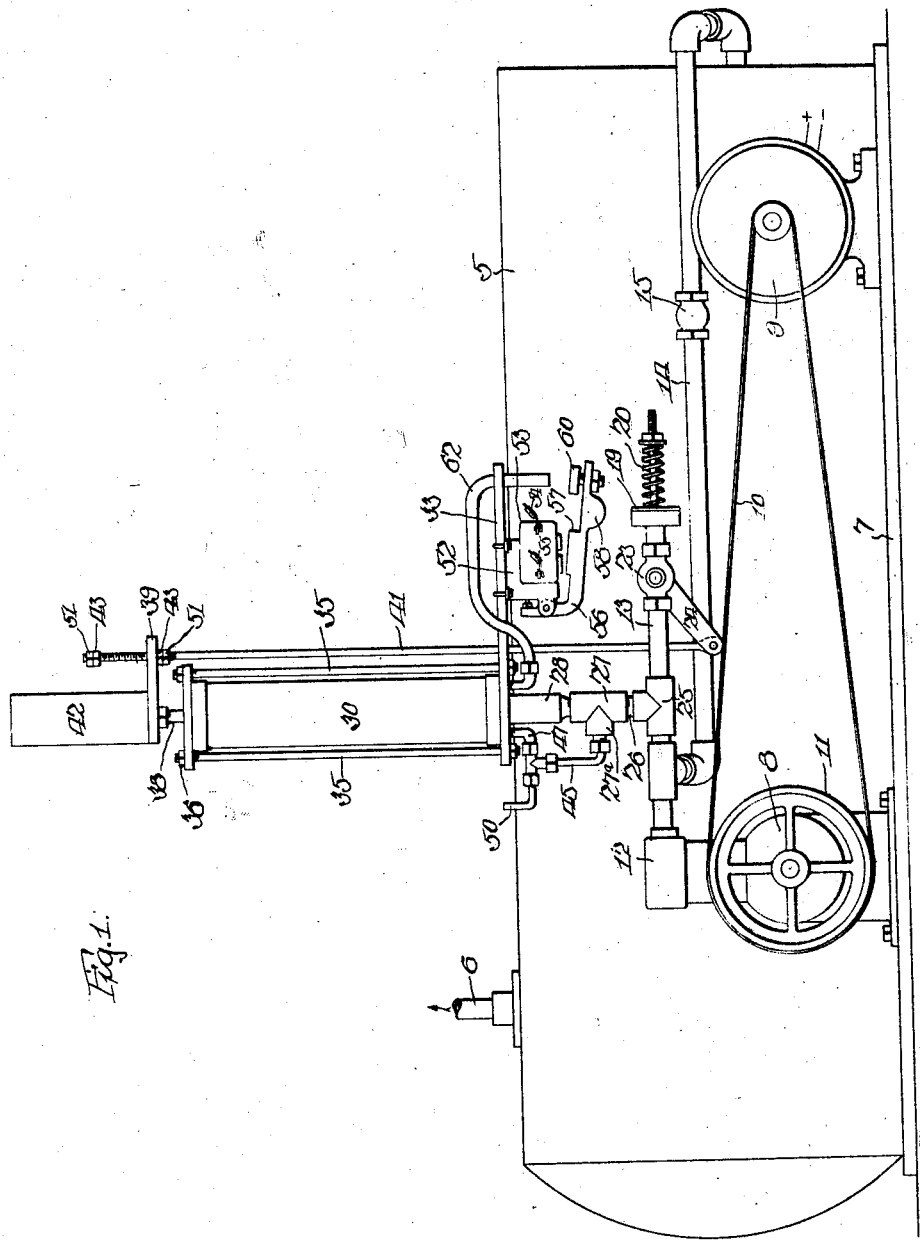
Fig. 1, is a view in side elevation of the invention, showing it associated with a compressed air-tank, a supply pipe therefor, a compressor and a motor geared to the latter, with the parts in the positions they will occupy when at rest.
Figure 2:
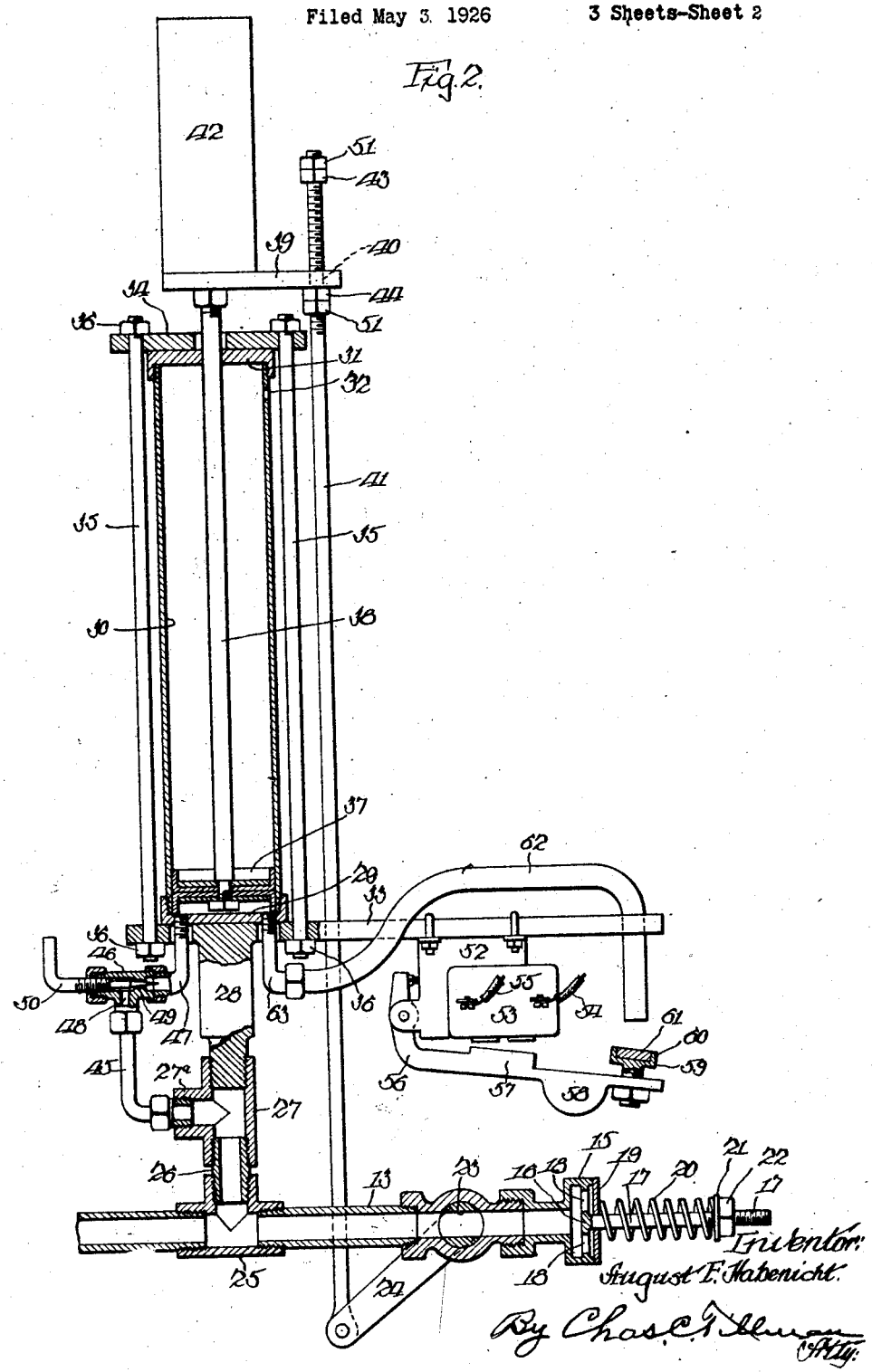
Fig. 2, is a slightly enlarged vertical sectional view of the apparatus with a part of the supply pipe, the tank, compressor and motor omitted, showing the parts in the same position as in Fig. 1.

Referring now more particularly to Figs. 1, and 2, of the drawings, the reference numeral 5, designates a suitably supported tank for the reception of compressed air, which may be fed or supplied therefrom for any suitable purpose by means of an outlet 6, communicating with the tank at any desired point, but usually, at its upper portion. Mounted on a suitable base 7, near the tank is an air compressor 8, of the conventional or any well known type, which is, as shown in Fig. 1, driven by a prime-mover, such as an electric motor 9, mounted on said base, and geared to the compressor by means of a belt 10, extended over the driving shaft of the motor and a pulley or wheel 11, of the compressor.

Extended upwardly from the compressor body is a supply conduit 12, which has horizontally extended therefrom and in communication therewith a valved pipe 13, which extends towards the motor but in a higher plane. Communicating at one of its ends with the valved pipe 13, near the conduit 12, is an air supply pipe 14, the other end of which communicates with the tank 5, preferably at one end thereof. The air supply pipe 14, is provided with a check valve 15, of the ordinary or well known construction, which is located between the connection of the pipe 14, with the tank, and its connection with the valved pipe 13, as is clearly shown in Fig. 1, of the drawings. This check valve is arranged so as to prevent the escape of air under pressure from the tank 5, but so as to admit air to said tank when the pressure from the compressor exceeds the pressure within the tank. The valved pipe 13, is in reality an extension of the conduit 12, and forms a support for the air supply pipe 14, as well as for the pressure-controlling cylinder and its associated elements as will be clearly seen by reference to Fig. 1, and hereinafter explained.

The pipe or passage 13, is provided at its free end with a valve casing 15, in which is seated and fixed a disk-like valve 16, having centrally thereof a stem 17, which extends outwardly therefrom and in a plane with the pipe 13, and has around its stem a plurality of openings 18, for the discharge of air. Loosely mounted on the stem 17, preferably so as to reciprocate on the same is a disk-valve 19, which is normally held in its closed position on the face of the valve-casing 15, by means of a spring 20, coiled around the stem 17, and having one of its ends resting against the valve 19, and its other end against a washer 21, slidably mounted on the stem 17, and adjustably held in place by means of a nut 22, engaging the screw threaded outer portion of the aforesaid valve stem.

By this arrangement it is obvious, that by regulating the tension of the spring 20, by turning the nut 22, in the proper direction, the valve 19, will be so held as to firmly close the casing 15, or so as to allow the escape of air from the pipe 13, and said valve casing when it is desired.

Between the juncture of the air supply pipe 14, with the pipe 13, and the valve-casing 15, the pipe 13, is provided with a shut-off valve 23, which has secured to its stem a depending crank arm 24, for the purpose to be presently explained.

Mounted on the pipe 13, between the valve 23, and the juncture of said pipe with the air supply pipe 14, is a T-coupling 25, which is, by preference, adjustably connected at its upper portion by means of a screw threaded pipe section 26, with another T-coupling 27, the upper portion of which has adjustably secured thereto the lower end of a support 28, for the lower head 29, of the controlling cylinder 30, of the mechanism. The upper end of the cylinder 30, is closed by a head 31, and just below the last named head the cylinder is provided with a vent opening 32, for the passage of air in the movement of the piston within said cylinder.

As will be clearly seen in the different views of the drawings, the cylinder 30, is located with its lower end partly on the support 28, and partly on the horizontal base or arm 33, and with its upper end against a holding member or plate 34, which latter member is secured by means of rods 35, and nuts 36, thereon to the arm or base 33, it being understood that any number of said rods may be employed and located around the cylinder 30, in such a way as to hold the same in its proper upright position.

Located in the cylinder 30, for reciprocation therein, is a piston-head 37, the piston rod 38, for its operation and guidance being centrally connected thereto and extended upwardly through suitable openings in the upper head of the cylinder, as well as in the member 34, against which the upper end of the cylinder rests. The piston rod 38, has secured to its upper end, externally of the cylinder, an arm 39, which extends to one side of the cylinder and is provided with a vertical opening 40, for the free passage of the upper portion of the operating rod 41, which is pivotally connected at its lower end to the arm 24, on the stem of the shut-off valve 23, as is clearly shown in the different views of the drawings.

Mounted on the arm 39, directly above the piston rod 38, is a weight 42, which normally holds the piston head 37, seated in the lower portion of the controlling cylinder.

It will be noted in the drawings, that the upper portion of the operating rod 41, for the shut-off valve 23, is screw threaded and has adjustably located thereon a pair of spaced nuts 43, and 44, between which the arm 39, is adapted to freely operate, when the pressure in the cylinder is of such a degree as to cause the piston head and the weight which it carries, to rise sufficiently for the arm 39, to strike the nut 43, when, as the pressure in the cylinder below its piston increases, the head, its weight 42, and arm 39, will be further advanced upwardly, thereby causing the rod 41, to be raised, thus turning the shut-off valve 23, until the piston head has reached the upward limit of its stroke, when it is obvious that the shut-off valve will be closed. In this operation it is manifest that the vent-opening 32, will prevent compression between the piston head and the upper end of the cylinder.

Extended upwardly from the neck or portion 27ª, of the T-coupling 27, is a connection 45, on the upper end of which is mounted in communication therewith a T-shaped valve-casing 46, one end of which is connected to the lower head 29, of the cylinder by means of a tubular member 47, which member extends through a suitable opening in the arm or base 33, on which the cylinder is partly mounted. The valve-casing 46, has a port 48, leading from the upper end of the channel member 45, and said casing has another port 49, which communicates with the lower end of the tube or member 47, and is for the passage of air, as well as for the reception of the pointed portion of a needle valve 50, which is adjustably mounted in that portion of the valve-casing 46, opposite its portion to which the tube 47, is connected. This needle valve is designed for manual operation, and is employed to regulate the quantity of air and pressure as it passes from the valved pipe 13, through the channeled member 26, the coupling 27, the connection 45, the valve 46, and the tube 47, into the lower end of the cylinder.

Again referring to the upper portion of the shut-off valve operating rod 41, it is apparent that the nuts 43, and 44, may be sustained in their adjusted positions by means of lock nuts 51, one of which abuts the outer portion of each of said nuts and engages the screw threads on said rod. Mounted on the base or arm 33, and depending therefrom is a bracket 52, which carries an electro-magnet 53, of the preferred or ordinary construction which has conductors 54, and 55, leading to a source of electric supply (not shown), and preferably the source that drives the motor of the apparatus. Pivotally secured to one end of the bracket 52, is a lever 56, which extends under the magnet 53, and has an armature 57, for cooperation with the same. This lever is provided with a weight 58, to normally hold it in its depressed position as shown in the different views of the drawings. Near its free end the lever 56, is provided with an adjustable or screw threaded stopping member 59, which is provided with a cup 60, having therein resilient material 61, for co-action with the free end of an exhaust pipe 62, which extends upwardly through the base 33, and thence along the same, and then downwardly, and thence upwardly and terminates with the tubular member 63, which communicates through the lower head 29, of the cylinder with the latter.

In Fig. 3, of the drawings I have illustrated a modification in the construction of the device, which consists in employing the elements heretofore described and referred to, but instead of using the closing means just above described, for the exhaust pipe of the cylinder I substitute therefor a shut-off valve 64, located in the exhaust pipe 62, above the base or arm 33, and extend the lower portion of the casing 65, of said valve through a suitable opening in the arm or base. In order to operate this shut-off valve 64, the same is provided on its stem, with an arm 66, to which is pivotally secured a rod 67, the other end of which is adjustably connected to the free portion of the lever 56, which is equipped as before with an armature 57, and a weight 58, which weighted lever normally holds the valve 66, in its open position.

From the foregoing and by reference to the drawings, it will be readily understood and clearly seen, that, assuming the tank or reservoir contains a pre-determined degree of pressure, and it is desired to supply it with additional pressure, it is obvious that the compressor must be driven at such speed as to supply the pipe 14, with pressure in excess of that contained in the tank or reservoir. If the pressure within the tank is great, it is manifest that the load placed on the motor in order to drive the compressor at proper speed, may be such as to cause the motor to burn out. Now, by my improvements, this result is avoided, for it will be understood that as the pressure passes from the conduit 12, of the compressor, some of it will pass into the portion of the supply pipe 14, between the compressor and the check valve 15, but owing to the resistance of the check valve, other pressure will pass into the valved pipe 13, against the disk-valve 19, and other of the pressure will pass through the passages 26, 45, and 47, under the piston head 37. At this time it will be understood that the motor has been started, and that by reason of the connection of the magnet 53, through the conductors 54, and 55, with the electric current that operates the motor, or otherwise, the exhaust pipe 62, will be closed by the stopping member 59, or the shut-off valve 64, when the form shown in Fig. 3, is employed. The tension of the spring 20, can be regulated to the proper degree to allow an amount of pressure to escape or bleed through the valve-casing 15, and it will be understood that some of the pressure which passes upwardly from the coupling 25, to the cylinder will exert itself upon the piston head until the same is raised sufficiently for the arm 39, to strike the nut 43, on the operating rod 41, which, in the further upward advancement of the piston 37, its arm, and weight, it will be understood that the rod 41, will be carried with said arm, thereby turning the shut-off valve 23, to a position to close the pipe 13, with respect to the valve 19, thus directly after the compressor has attained its maximum speed the pressure will be directed through the supply pipe 14, and against the check valve thereof, thus permitting it to pass into the tank.

Having thus fully described the invention, what I claim as new and desire to secure by Letters Patent is:—

1. A device of the class described, in combination, a supply pipe line of a pressure system provided with a check valve therein, a compressor communicating with said pipe line, a cylinder mounted vertically above said pipe line, a restricted passage connection uniting the said pipe line and the lower portion of said cylinder whereby the back pressure from the check valve will enter the cylinder, a reciprocating piston and its rod in said cylinder and having a weight and arm on the upper porton of said rod, a connection uniting the arm and a movable part, an exhaust pipe leading from the lower part of the cylinder and means to close said exhaust pipe when the compressor is in operation.

2. A device of the class described, in combination, a supply pipe line of a pressure system provided with a check valve therein, a compressor communicating with said pipe line, a cylinder mounted vertically above said pipe line, a valve controlled connection uniting the said pipe line and the lower portion of said cylinder whereby the back pressure from the check valve will enter the cylinder, a reciprocating piston and its rod in said cylinder and having a weight and arm on the upper portion of said rod, a connection uniting the arm and a movable part, an exhaust pipe leading from the lower part of the cylinder and means to close said exhaust pipe when the compressor is in operation.

3. A device of the class described, in combination, a supply pipe line of a pressure system provided with a check valve therein, a compressor communicating with said pipe line, a cylinder mounted vertically above said pipe line, a restricted passage connection uniting the said pipe line and the lower portion of said cylinder whereby the back pressure from the check valve will enter the cylinder, a reciprocating piston and its rod in said cylinder and having a weight and arm on the upper portion of said rod, a connection uniting the arm and a movable part, said last named connection so constructed and arranged with respect to said arm as to allow free movement thereof for a part of the length of said connection.

4. A device of the class described, in combination, a supply pipe line of a pressure system provided with a check valve therein, a compressor communicating with said pipe line, a cylinder mounted vertically above said pipe line, a needle valve controlled connection uniting the said pipe line and the lower portion of said cylinder whereby the back pressure from the check valve will enter the cylinder, a reciprocating piston and its rod in said cylinder and having a weight and arm on the upper portion of said rod, a connection uniting the arm and a movable part, an exhaust pipe leading from the lower part of the cylinder and means to close said exhaust pipe when the compressor is in operation.

5. In a device of the class described, the combination with a reservoir having a supply pipe therefor provided with a check valve, of a compressor communicating with said pipe and having a pipe extension in communication with said supply pipe and said compressor, an adjustable spring-pressed valve for closing one end of the pipe extension, a shut-off valve in said extension, a cylinder vertically supported above said supply pipe, a restricted passage connection uniting the lower portion of said cylinder and said extension, an exhaust pipe leading from the lower portion of the cylinder a reciprocating piston located in the cylinder, a piston rod secured at one of its ends to the piston and extended through the upper end of said cylinder, a weight and a lateral arm on the upper portion of the piston rod, a connection uniting said arm and said shut-off valve for turning the latter, and means for closing the said exhaust pipe when the compressor is in operation.

6. In a device of the class described, the combination with a reservoir having a supply pipe therefor provided with a check valve, of a compressor communicating with said pipe and having a pipe extension in communication with said supply pipe and said compressor, an adjustable spring-pressed valve for closing one end of the pipe extension, a shut-off valve in said extension, a cylinder vertically supported above said supply pipe, a restricted passage connection uniting the lower portion of said cylinder and said extension, an exhaust pipe leading from the lower portion of the cylinder, a reciprocating piston located in the cylinder, a piston rod secured at one of its ends to the piston and extended through the upper end of said cylinder, a weight and a lateral arm on the upper portion of the piston rod, a connection uniting said last named connection so constructed and arranged with respect to said arm as to allow independent movement of the arm for a part of the length of said connection, and means for closing the said exhaust pipe when the compressor is in operation.

AUGUST F. HABENICHT.